Dec. 11, 1962   J. M. DIVOLA ET AL   3,067,970
TRIM FORCE CONTROL SYSTEM
Filed May 26, 1960
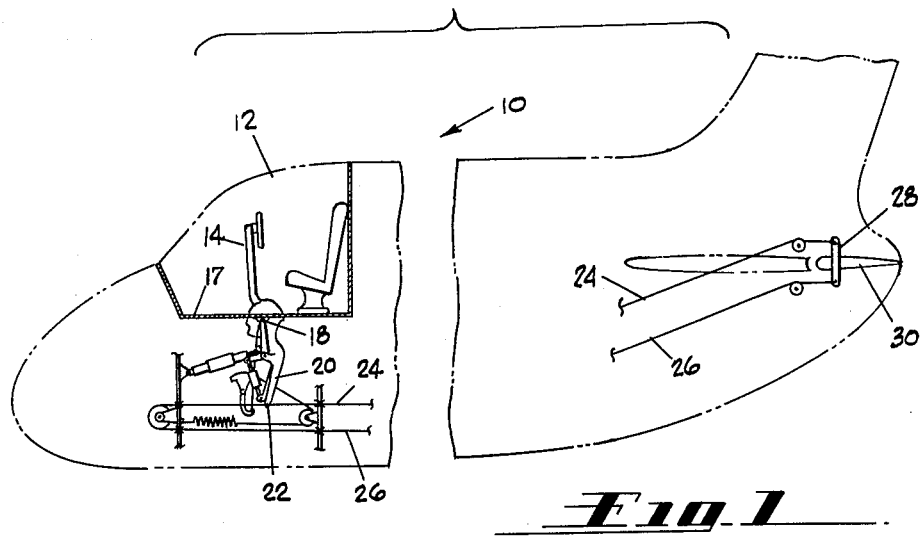
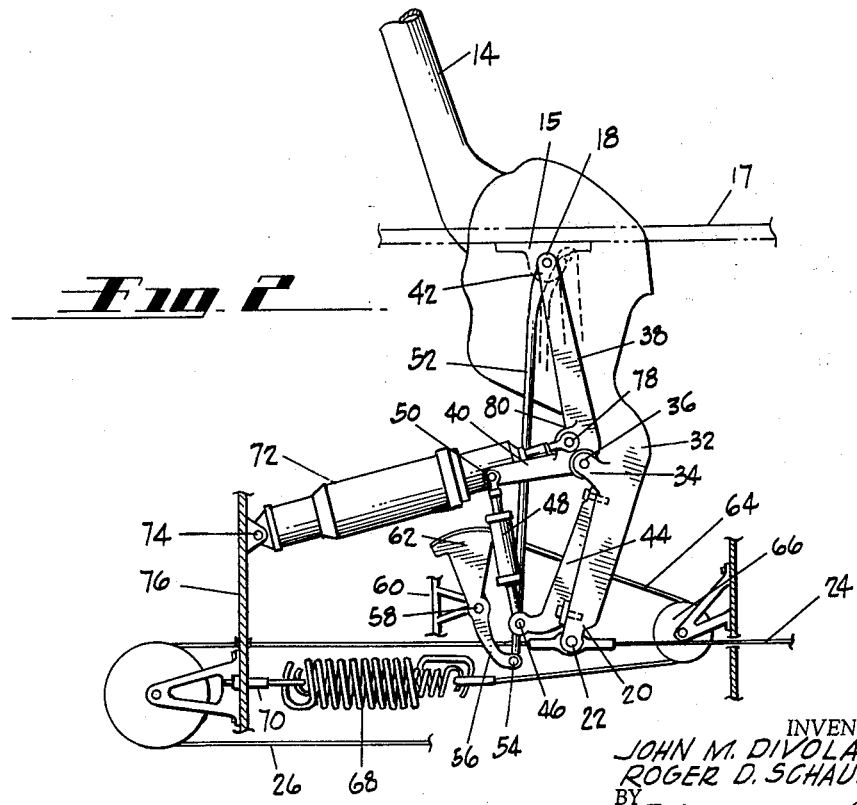
INVENTORS
JOHN M. DIVOLA AND
ROGER D. SCHAUFELE
BY
Edwin Coates
-ATTORNEY-

United States Patent Office 3,067,970
Patented Dec. 11, 1962

3,067,970
TRIM FORCE CONTROL SYSTEM
John M. Divola, Calabasas, and Roger D. Schaufele, Woodland Hills, Calif., assignors to Douglas Aircraft Company, Inc., Santa Monica, Calif.
Filed May 26, 1960, Ser. No. 31,961
6 Claims. (Cl. 244—83)

This invention relates to a trim force control system and has particular reference to such a system for use in modern high speed airplanes which encounter unusual aerodynamic phenomena not experienced by airplanes in the lower speed category.

Most propeller driven airplanes operate in speed ranges from fifty to four hundred miles per hour. In these ranges stability is no longer a serious problem for the designer. Although a given airplane will trim out differently at various speeds within its range there are various known ways of compensating so as to maintain the desired level flight. The airplane tends to nose-up to varying degrees and the known devices are designed and used to counteract this tendency.

The present generation of jet engined airplanes operates at speeds in excess of six hundred miles per hour. It has been found that, commencing at a speed of about Mach 0.80, increases in speed result in an increasing tendency to nose-down or "tuck under." At lower speeds, tendencies toward instability can be taken care of manually if desired, but at these high speeds the pilot's attention is taken up with so many other vital problems that it becomes essential to take care of the instability problem with an automatic device.

The present invention solves the problem by providing a mechanism which gradually changes the neutral position of the control column and increases the nose-up moment of the elevator surfaces at the proper rate to counteract the increasing nose-down tendency of the airplane. Most airplanes, including the one herein concerned, are provided with double acting centering spring devices which are designed and arranged to produce a gradually increasing yielding resistance to fore or aft movement of the control column away from its neutral position. This is desirable to give the pilot the desired load-feel in the controls. Movement of the column to a new neutral position as mentioned above would normally result in upsetting the relation of the centering spring to the column and cause it to "fight" the new position, which would be highly undesirable. The present invention takes this into account and alters the relationship of the parts so that, in effect, the centering spring floatingly follows the column to each adjusted position.

The manner in which these functions are accomplished and other advantages and features of novelty of the invention will become apparent as the description proceeds in connection with the accompanying drawing, in which:

FIG. 1 is a diagrammatic elevational view of an airplane incorporating the novel trim force control system; and FIG. 2 is a side elevational view, somewhat diagrammatic, to an enlarged scale of the detail mechanism of the system.

The airplane 10 includes a pilot's compartment 12 in which a control column 14 is pivotally mounted to the floor 17, intermediate the ends of the column about a transverse axis 18 so that the column may be rocked fore and aft in a vertical longitudinal plane parallel to the axis of the fuselage. At the lower extremity 20 of the column a cross pin 22 is provided to attach the ends of the control cable which has two rearwardly extending runs 24, 26. The aft ends of these cables are attached to control horn 28 carried by elevator 30 which is pivotally attached to the structure of the airplane about a transverse axis for rotation up and down to provide nose-up and nose-down pitching moments respectively. The elevator is shown in its simplest form but the cables can be attached to a servo tab which controls the elevator movements in flying tab type systems.

As seen more clearly in FIG. 2, the column 14 is mounted for pivotal movement in a support 15 carried by floor 17. In its normal neutral position, when the airplane is travelling in level flight, the column is in a generally vertical attitude with its upper portion tilted slightly forward, and the elevator is also in a generally neutral position as indicated in FIG. 1. This is the general condition at a speed of about Mach 0.80 and the airplane is considered to be in neutral trim. As the cruise speed of Mach 0.80 is exceeded, the "tuck-under" phenomenon begins to manifest itself, and the nose-down tendency of the airplane becomes greater with the increase in speed. In order to counteract this tendency it is desirable to provide an automatic device to rotate the column aft to new neutral positions which in turn rotate the elevator upwardly to produce the right amount of nose-up moment to counteract the tendency.

The lower portion 32 of the column is provided with a boss 34 to which a bell crank is pivotally mounted at 36. The bell crank includes a first upwardly extending arm 38 and a second generally horizontally extending arm 40. The upper extremity of the first arm carries a pivot 42 which, in cruise trim position as shown in solid lines, is substantially in line with the pivot axis 18 of the column. The lower extremity of the column includes a bracket 44 having a pivot connection 46. Extensible actuator 48 has its lower end attached to the pivot connection 46 and its upper end attached to the pivot connection 50 at the end of arm 40. In any position of adjustment this assembly provides a rigid triangle and retains arm 38 in a desired adjusted position. The actuator, through known means not shown, is sensitive to the Mach number and is so designed and adjusted that it will extend as the speed of the airplane exceeds Mach 0.80. In one such extended position it will move arm 38 to the position shown in dotted lines for purposes to be explained hereinafter.

A generally vertically extending push-pull or tension rod 52 is pivotally attached at its upper end to the pivot end 42 of arm 38. Its lower end is pivotally connected at 54 to the lower arm 56 of a bell crank pivotally attached at 58 to support 60. The upper arm 62 of the bell crank constitutes an arcuate sector to which is attached cable 64. The latter extends around pulley 66 and is attached to tension springs 68 which in turn are secured to the structure at 70.

It will now be seen that springs 68, through their associated mechanism, will apply a tension force to rod 52 at all times. When arm 38 is in the solid line position, the reaction of the rod will pass through pivot axis 18 of the column and will have no effect on it. However, when actuator 48 extends in response to increase in the Mach number beyond the predetermined value, arm 38 will move to the dotted line position and the tension reaction will be behind pivot axis 18. The resulting clockwise moment will rock column 14 aft to a new neutral position, raising elevator 30 to produce the necessary nose-up moment. When the airplane speed is reduced back to Mach 0.80, rod 38 will return to its original position and so will the column.

A control centering spring 72 is also incorporated in the system. It is pivotally attached at 74 to support 76 and pivotally attached at 78 to boss 80 on arm 38. Member 72 is a device having the basic length shown in the drawing and contains springs so arranged in a known manner so that they yieldingly resist at equal rates either extension or contraction of the cylindrical casing. When attached as shown it yieldingly resists both fore and aft movement of the control column and returns it to neutral position when the pilot releases his displacing force.

If the column were moved to a new neutral position as described above without compensation, the centering spring would be compressed and would urge the column back toward its original position. The compensation is provided by the fact that boss 80 and pivot points 78 are moved to the right, as seen in FIG. 2, with respect to portion 32 of the column at the same time as portion 32 is moved to the left by the tension rod force. Consequently pivot point 78 stays in or returns to substantially the same point in space so that member 72 is not stressed out of its neutral condition by the adjustment.

It will be apparent to those skilled in the art that various changes and modifications may be made in the construction disclosed without departing from the spirit of the invention, and it is intended that all such changes and modifications shall be embraced within the scope of the following claims.

We claim:

1. A trim force control system for an airplane comprising: a control column pivotally mounted in a generally vertical position at a point intermediate its ends for fore and aft rotational movement; a control surface pivotally mounted for movement to produce nose-up and nose-down pitching moments; means connecting said column to said surface to move same to produce a nose-up moment upon after movement of said columns; a first bell crank pivotally carried on the lower portion of said column and having an upwardly extending arm and a generally horizontally extending arm; an actuator pivotally connected at its one end to the free end of said horizontally extending arm and at its other end to the lower extremity of said column; the upwardly extending arm terminating at a point substantially in line with the pivotal axis of said column; a push-pull rod pivotally attached at one end to the terminal end of said upwardly extending arm and extending downwardly in a generally vertical direction; a second pivotally mounted bell crank having an arm pivotally connected to said push-pull rod and having another portion connected to a spring biasing means so as to exert tension in said rod at all times; and a control centering spring anchored at one end and pivotally connected at its other end to the upwardly extending arm of said first bell crank and acting to yieldingly resist fore and aft movement of said column away from its normal neutral position; said actuator being extensible in response to increase in Mach number beyond a predetermined value to rotate said first bell crank and move the terminal end of the upwardly extending arm thereof out of registry with the pivotal axis of said column, whereupon the spring biased second bell crank will exert an aft acting moment on said column to move it to a new neutral position to overcome the nose-down tendency of the airplane; the relative movements of said column and said first bell crank combining to produce a substantially zero movement of the pivotal connection of the control centering spring to said bell crank.

2. In an airplane, a trim force control system comprising: a control column pivotally mounted to said airplane on a lateral axis intermediate the ends of said column, extending in a generally vertical direction and rotatable fore and aft about said axis; a control surface pivotally mounted on said airplane for movement to produce nose-up and nose-down pitching moments; means connecting said column to said surface to move same to produce a nose-up moment upon aft movement of the column; a bell crank pivotally carried on the lower portion of said column; a first arm on said bell crank having a free end normally aligned with the pivotal axis of said column; a second arm of said bell crank extending generally horizontally; an actuator pivotally connected to the free end of said second arm and to the lower extremity of said column and extensible in response to increase in Mach number beyond a predetermined value to rotate said bell crank and move the free end of said first arm out of registry with the pivotal axis of said column; a tension rod pivotally attached to the free end of said first arm and extending generally downwardly; spring biasing means attached to the lower end of said rod to exert tension thereon at all times; and a control centering spring anchored at one end and pivotally connected at its other end to the first arm of said bell crank and acting to yieldingly resist fore and aft movement of said column away from its normal neutral position; said tension rod, when the free end of said first arm is displaced, exerting an aft acting moment on said column to move it to a new neutral position to overcome the nose-down tendency of the airplane; the relative movements of said column and said bell crank combining to produce a substantially zero movement of the pivotal connection of the control centering spring to said bell crank.

3. In an airplane, a trim force control system comprising: a control column pivotally mounted to said airplane on a lateral axis intermediate the ends of said column, extending in a generally vertical direction and rotatable fore and aft about said axis; a control surface pivotally mounted on said airplane for movement to produce nose-up and nose-down pitching moments; means connecting said column to said surface to move same to produce a nose-up moment upon aft movement of the column; a lever pivotally carried on the lower portion of said column and having a free end normally aligned with the pivotal axis of said column; an actuator carried by the lower end of said column and engaging said lever, said actuator being extensible in response to increase in Mach number beyond a predetermined value to rotate said lever and move its free end out of alignment with the pivotal axis of said column; tension means attached to the free end of said arm and exerting a downward force thereon at all times; and a control centering spring anchored at one end and pivotally connected at its other end to said lever and acting to yieldingly resist fore and aft movement of said column away from its normal neutral position; said tension means, when the free end of said lever is displaced, exerting an aft acting moment on said column to move it to a new neutral position to overcome the nose-down tendency of the airplane; the relative movements of said column and said lever combining to produce a substantially zero movement of the pivotal connection of the control centering spring to said lever.

4. In an airplane, a trim force control system comprising: a control column pivotally mounted to said airplane on a lateral axis intermediate the ends of said column, extending in a generally vertical direction and rotatable fore and aft about said axis; a control surface pivotally mounted on said airplane for movement to produce nose-up and nose-down pitching moments; means connecting said column to said surface to move same to produce a nose-up moment upon aft movement of the column; a member movably mounted on said column and having a force-application point movable from a position in alignment with the pivotal axis of said column to a position rearward thereof; actuating means to move same rearwardly in response to increase in Mach number beyond a predetermined value; tension means connected to said force-application point and exerting a downward force thereon at all times; said force having no affect on the column when the force-application point is aligned with the pivotal axis of the column but producing an aft acting moment on said column when the force-application point is rearwardly displaced, said column in moving aft in response to said moment effecting the return of said force-application point to alignment with the pivotal axis of the column whereby a different neutral elevator position is established.

5. In an airplane, a trim force control system comprising: a control column pivotally mounted to said airplane on a lateral axis intermediate the ends of said column, extending in a generally vertical direction and rotatable fore and aft about said axis; a control surface pivotally mounted on said airplane for movement to produce nose-up and nose-down pitching moments; means connecting said column to said surface to move same to produce a nose-up moment upon aft movement of the column; tension means connected to exert a downward force on said column at all times, said tension means being normally aligned with the pivotal axis of the column and producing no effect thereon; and means responsive to increase in Mach number beyond a predetermined value to displace said tension means rearwardly to a position in which it produces an aft acting moment on said column to move it to a new neutral position to overcome the nose-down tendency of the airplane.

6. In an airplane, a trim force control system comprising: a control column pivotally mounted to said airplane on a lateral axis intermediate the ends of said column, extending in a generally vertical direction and rotatable fore and aft about said axis; a control surface pivotally mounted on said airplane for movement to produce nose-up and nose-down pitching moments; means connecting said column to said surface to move same to produce a nose-up moment upon aft movement of the column; spring-biased tension means exerting a force on said column at all times through a variable moment arm; and means responsive to increase in Mach number beyond a predetermined value to increase the moment arm to produce an aft acting moment on said column and move same to a new neutral position to overcome the nose-down tendency of the airplane.

References Cited in the file of this patent
UNITED STATES PATENTS

| | | |
|---|---|---|
| 2,613,891 | Knight | Oct. 14, 1952 |
| 2,797,882 | Servanty | July 2, 1957 |
| 2,955,784 | Vogel et al. | Oct. 11, 1960 |
| 2,992,796 | Wheldon | July 18, 1961 |